Sept. 17, 1929. J. M. WESTGAARD 1,728,846
POTATO PEELING MACHINE
Filed July 5, 1927

J. M. Westgaard
INVENTOR by: Markes & Clark
Attys.

Patented Sept. 17, 1929

1,728,846

UNITED STATES PATENT OFFICE

JUUL MARKUS WESTGAARD, OF STOCKHOLM, SWEDEN, ASSIGNOR TO CARL SETTERBERG AND GUSTAF ALBERT ERICSSON, BOTH OF STOCKHOLM, SWEDEN

POTATO-PEELING MACHINE

Application filed July 5, 1927, Serial No. 203,607, and in Sweden November 11, 1926.

The present invention refers to a potato peeling machine, in which a shaft centrally journalled within a casing carries a disk provided with a coating or layer of a grinding substance. The novelty of the invention resides in the feature that the said casing is without a bottom and deviates from the common, uniformly cylindrical shape, in that it is provided with bulges or ridges extending in the axial direction, said bulges or ridges compelling the potatoes lying on the rotating disk and hurled outwards by the centrifugal force, again to move up onto the disk, whereby the potatoes are caused to roll in all directions and are being dressed by the layer of grinding substance on the surfaces of the disk and of the casing.

Figure 1:
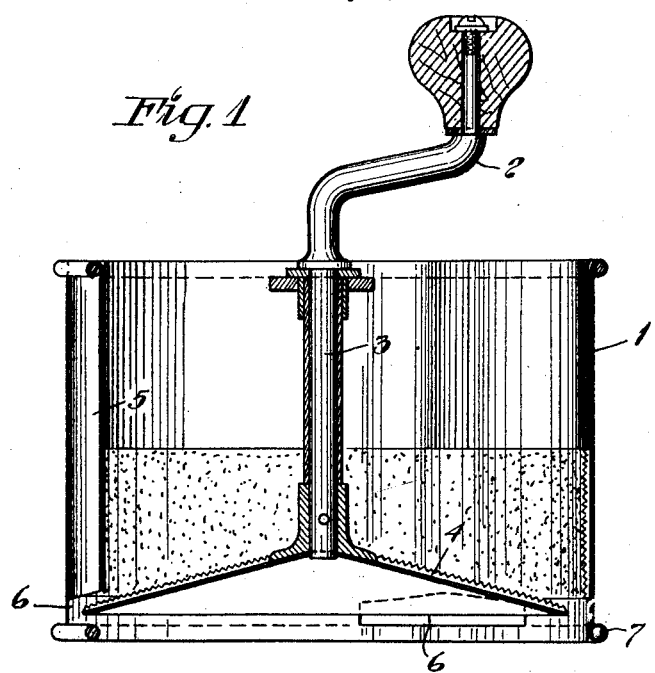
Figure 2:
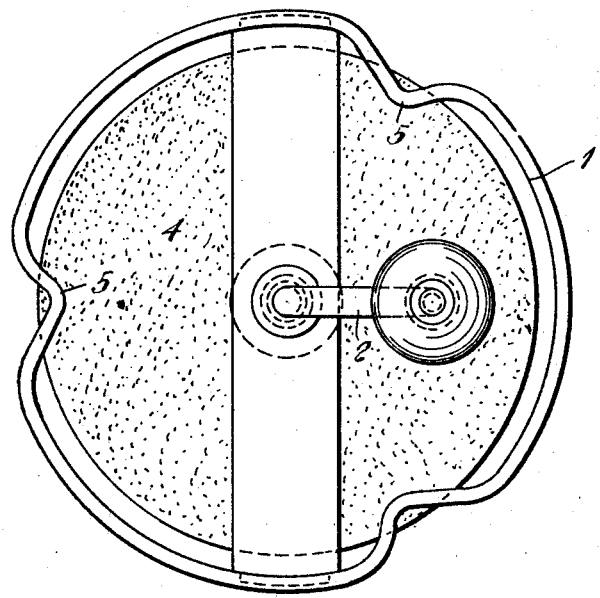

The potato peeling machine according to the invention is illustrated in the accompanying drawing, where Fig. 1 shows a longitudinal section and Fig. 2 a plan view of the machine.

On a substantially cylindrical, downwardly open mantle 1, there are provided bearings for a shaft 3 fitted with a crank 2 and carrying a disk 4 situated in the proximity of the lower edge of the mantle, said disk 4 being provided with a layer of a grinding substance. In the mantle 1 there are arranged a number of bulges, for instance three bulges, extending in the axial direction, said bulges forming ridges 5 on the inner wall of the mantle. Those parts of the inner surface of the mantle which are located between said ridges are also provided with a layer of a grinding substance. For the disk 4, which is of a somewhat smaller diameter than the mantle 1, there are provided slots or openings 6 in the ridges 5. The lower edge of the mantle can be folded or channeled or be reinforced by a ring or the like 7.

In operation, the potato peeling machine is filled with a suitable quantity of potatoes which will be carried by the disk 4, the machine being placed into a tub or the like containing water, whereupon the disk 4 is brought into rotation by means of the crank 2. After the potatoes have been sufficiently dressed, the machine is lifted out of the tub, so that the water flows off between the disk and the mantle 1 together with particles and skin ground off the potatoes.

What I claim is:—

1. A potato peeling machine, comprising a cylindrical mantle provided at its inner face with a lining of a grinding substance, a shaft centrally journalled in said mantle, means comprising a bearing for said shaft secured to said mantle for preventing axial displacement between said mantle and said shaft, and a rotary disk secured to the lower end of said shaft and having a covering of a grinding substance on its upper surface, said mantle being open downwardly, and inwardly extending bulges on the inner wall of said mantle forming ridges, said ridges having slots provided therein for the said disk.

2. A potato peeling machine according to claim 1, wherein the said rotary disk is of a somewhat smaller diameter than the largest internal diameter of said mantle.

In testimony whereof I affix my signature.

JUUL MARKUS WESTGAARD.